United States Patent
Dumm

(10) Patent No.: US 10,334,819 B2
(45) Date of Patent: Jul. 2, 2019

(54) STORAGE BAG WITH JOINED CENTER PORTION

(71) Applicant: Richard H Dumm, Windsor, CO (US)

(72) Inventor: Richard H Dumm, Windsor, CO (US)

( * ) Notice: Subject to any disclaimer, the term of this patent is extended or adjusted under 35 U.S.C. 154(b) by 106 days.

(21) Appl. No.: 15/652,544

(22) Filed: Jul. 18, 2017

(65) Prior Publication Data
US 2019/0021279 A1    Jan. 24, 2019

Related U.S. Application Data

(60) Provisional application No. 62/440,557, filed on Dec. 30, 2016.

(51) Int. Cl.
| | | |
|---|---|---|
| *A01K 9/00* | (2006.01) | |
| *B65D 75/26* | (2006.01) | |
| *B65D 75/58* | (2006.01) | |
| *B65D 47/12* | (2006.01) | |
| *B65D 85/80* | (2006.01) | |
| *A01K 7/00* | (2006.01) | |
| *A23C 9/20* | (2006.01) | |
| *A23C 3/023* | (2006.01) | |
| *B65D 75/56* | (2006.01) | |

(52) U.S. Cl.
CPC .............. *A01K 9/005* (2013.01); *A01K 7/00* (2013.01); *A23C 3/023* (2013.01); *A23C 9/206* (2013.01); *B65D 47/122* (2013.01); *B65D 75/26* (2013.01); *B65D 75/566* (2013.01); *B65D 75/5883* (2013.01); *B65D 85/80* (2013.01); *B65D 2575/586* (2013.01)

(58) Field of Classification Search
CPC .. A23C 3/023; A23C 3/02; A01K 5/00; A01K 9/00; A23L 3/001; A23L 3/003; B65D 75/30; B65D 75/58
USPC ............ 119/71, 72; 206/524.1; 222/92, 105, 222/107; 383/32, 103, 109
See application file for complete search history.

(56) References Cited

U.S. PATENT DOCUMENTS

| | | | | |
|---|---|---|---|---|
| 3,380,646 | A * | 4/1968 | Doyen | B29C 65/04 383/104 |
| 3,663,239 | A * | 5/1972 | Rowe | B65D 75/5805 383/100 |
| 3,873,735 | A * | 3/1975 | Chalin | B65D 75/58 206/459.5 |
| 3,874,342 | A * | 4/1975 | Kloss | A01K 9/00 119/71 |
| 4,445,550 | A * | 5/1984 | Davis | B65D 37/00 141/329 |
| 5,749,493 | A * | 5/1998 | Boone | B65D 75/5877 222/105 |
| 5,791,521 | A * | 8/1998 | Kitamura | H01M 4/1393 222/105 |
| 5,915,596 | A * | 6/1999 | Credle, Jr. | B65D 77/065 222/105 |
| 8,336,495 | B1 | 11/1999 | Dumm | |

(Continued)

*Primary Examiner* — Yvonne R Abbott-Lewis
(74) *Attorney, Agent, or Firm* — Leyendecker & Lemire, LLC

(57) ABSTRACT

A flexible and collapsible liquid storage bag comprising front and back walls formed from a sheet material is described wherein a front wall and a back wall are joined along a perimeter of the bag and are also joined at a joined center portion proximate the centers of the respective front and back sheets. The bags are typically used in the storage, heat-treatment and dispensing of bovine colostrum.

23 Claims, 11 Drawing Sheets

(56) References Cited

U.S. PATENT DOCUMENTS

| | | | | |
|---|---|---|---|---|
| 6,273,307 B1* | 8/2001 | Gross | B65D 75/5883 | 220/613 |
| 6,348,246 B1* | 2/2002 | Finestone | B32B 27/10 | 206/524.2 |
| 6,374,773 B1* | 4/2002 | McIntyre | A01K 9/00 | 119/72 |
| 6,478,190 B2* | 11/2002 | Kuge | B65D 35/10 | 222/107 |
| RE39,520 E* | 3/2007 | Hess, III | B65D 5/746 | 222/105 |
| 7,360,501 B2* | 4/2008 | Jacobsen | A61D 7/00 | 119/72 |
| 7,722,254 B2* | 5/2010 | Murray | B29C 65/08 | 383/38 |
| 7,754,257 B2* | 7/2010 | Matsumoto | B65D 81/3897 | 220/592.2 |
| 7,972,064 B2* | 7/2011 | Anderson | B65D 33/2508 | 251/82 |
| 8,056,508 B1* | 11/2011 | Bryan | A01K 9/00 | 119/71 |
| 8,056,510 B2* | 11/2011 | Handley | A01K 7/00 | 119/65 |
| 8,070,016 B2* | 12/2011 | Kawakami | B65D 75/5822 | 222/107 |
| 8,408,408 B1 | 4/2013 | Dumm | | |
| 8,490,577 B1* | 7/2013 | Dumm | A01K 9/00 | 119/51.01 |
| 9,357,798 B2 | 6/2016 | Dumm | | |
| 2006/0072858 A1* | 4/2006 | Kurosawa | B29C 65/18 | 383/44 |
| 2009/0028470 A1* | 1/2009 | Murray | B65D 33/2508 | 383/80 |
| 2011/0075954 A1* | 3/2011 | Kumar | B65D 33/1658 | 383/204 |
| 2011/0151069 A1* | 6/2011 | Harding | A61J 9/001 | 426/117 |
| 2018/0050854 A1* | 2/2018 | Franca | B65D 75/5883 | |
| 2018/0086527 A1* | 3/2018 | Ma | B65D 47/122 | |

* cited by examiner

US 10,334,819 B2

STORAGE BAG WITH JOINED CENTER PORTION

RELATED REFERENCES

This application incorporates the following patent documents by reference in their entirety: (1) U.S. Pat. No. 8,336,495 entitled Flexible Heat Treatment And Storage Bag to Richard Dumm; (2) U.S. Pat. No. 8,490,577 entitled Feeding Method Using A Flexible Heat Treatment and Storage Bag to Richard Dumm; (3) U.S. Pat. No. 8,408,408 entitled Nipple Assembly and Mounting Tools to Richard Dumm; and (4) U.S. Pat. No. 9,357,798 entitled Proof Of Treatment Closure And Methods of Use also to Richard Dumm. This application claims priority to and fully incorporates by reference U.S. provisional patent application 62/440,557 filed Dec. 30, 2016 having the title STORAGE BAG WITH CENTER WELD and having the same inventorship as the present application.

BACKGROUND

Flexible bags for the storage, heat treatment of and dispensing of colostrum to bovine calves are known. One bag is described in detail in U.S. Pat. No. 8,336,495 issued on Dec. 25, 2012 to the present inventor. Various nipple assemblies and mounting tools that can be used with flexible storage bags is described in U.S. Pat. No. 8,408,408 issued on Apr. 2, 2013 to the present inventor. A method of feeding a calf using a flexible storage bag is described in U.S. Pat. No. 8,490,577 issued on Jul. 23, 2013 also to the present inventor. U.S. Pat. No. 9,357,798 issued on Jun. 7, 2016 again to the present inventor and describes vessel, which can comprise a flexible bag, in combination with a cap or closure that indicates to a user when the contents of the vessel remote from the vessel's walls have reached a predetermined temperature. All four of the foregoing patents are incorporated herein by reference for the teachings contained therein.

The flexible bags are typically used to store colostrum that has been expressed from cows that have just given birth to a calf or calves. The colostrum is stored in the bags which can be immediately heat-treated or refrigerated or frozen to preserve the valuable contents. The colostrum is heat-treated in a specialized pasteurizer between predetermined minimum and maximum temperatures, frozen or refrigerated for storage and removed from storage and warmed prior to use. The bag and its contents might then have special accessories attached to the bag which allow the operator to feed a calf directly from the bag as covered in U.S. Pat. No. 8,408,408. Maintaining a narrow temperature band is critical especially during pasteurization. Depending on the configuration of the bag and its contents, the colostrum proximate the outside of the bag is heated more quickly to the desired temperature than the contents closer to the center of the bag farthest away in distance from the bag walls. Without being able to maintain a proper configuration, and in order to heat the centermost contents to the desired temperature in a time efficient manner, the colostrum closest the bag walls may inadvertently be heated to a temperature higher than the predetermined maximum temperature. Higher temperatures can cause degradation of the desirable properties of the colostrum, and as such, heating the colostrum to a temperature exceeding the maximum temperature is to be avoided as much as is possible.

Sometimes it is necessary to access small amounts of colostrum stored in a storage bag, such as for a sample for testing or a very small amount necessary for a feeding. Further, on occasion, it is necessary to add small amounts of medicine or a reagent to a bag before, during or after pasteurization. In anyone of these instances, removal of a cap on the spout is necessary to gain access. This can be messy, and destroys any safety seal that may be present on the spout making it more difficult to later assess whether the contents of the bag have been improperly accessed thereafter. Perhaps most importantly, the opening of the cap subjects the contents to atmosphere potentially compromising sterility and potentially contaminating the bag's contents.

DETAILED DESCRIPTION

Figure 1:
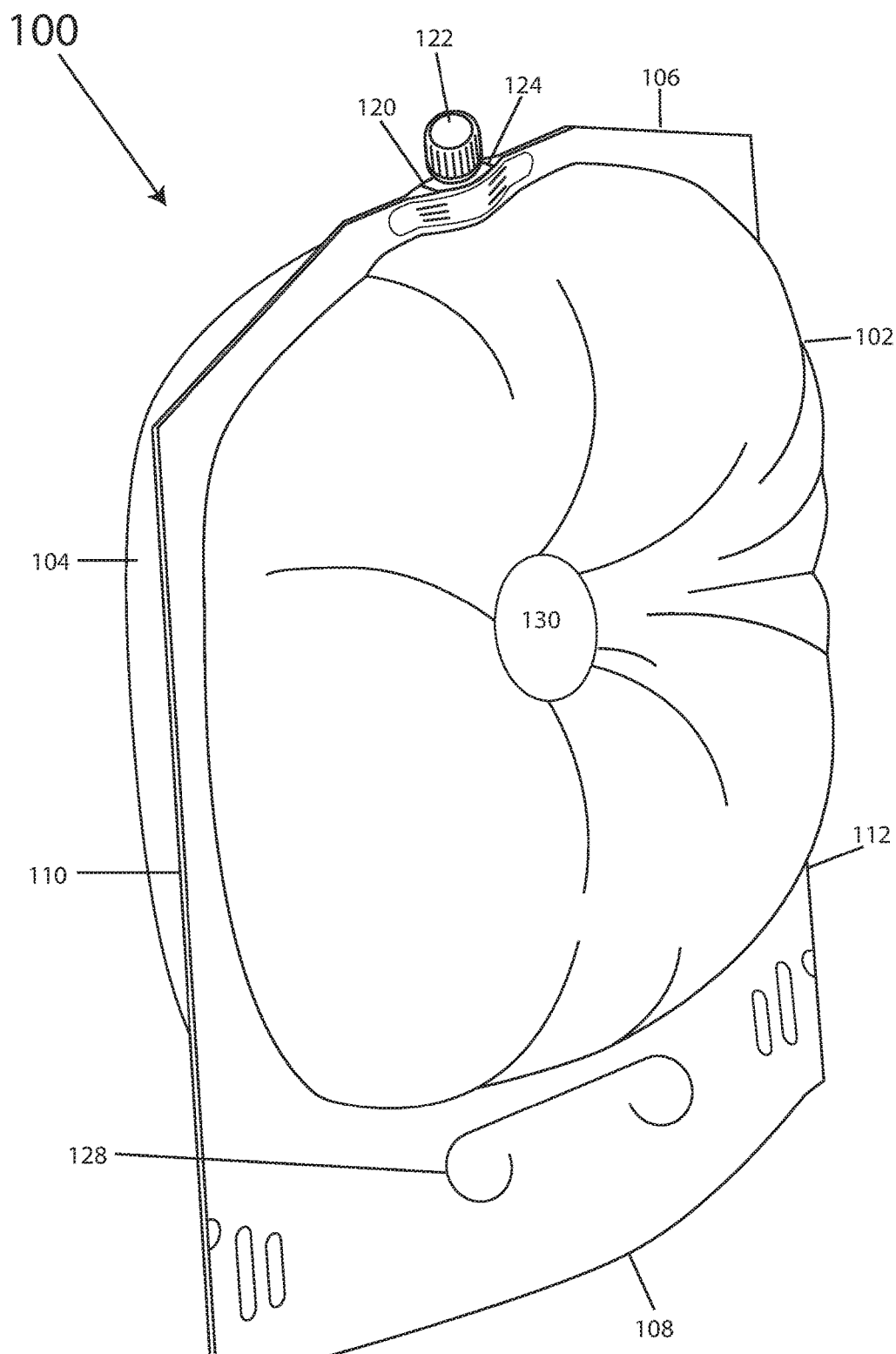
FIG. 1 is a perspective view of a storage bag having fused center section according to one embodiment of the present invention.

Embodiments of the present invention comprises a flexible and collapsible liquid storage bag formed from sheet material and having a dispensing orifice. Except for the gusset (also typically made of the same sheet material and as described below), the bag is substantially comprised of two sheets of sheet material that are thermally welded together or joined by any other suitable means along the perimeter of the sheets to form a substantially liquid tight vessel. In some variations the sheets are integral to each other interconnected along folds.

In embodiments the dispensing orifice, typically a threaded spout comprised of thermoplastic materials, is located at a top end and is thermally welded to the sheet material to form a liquid-tight seal. In variations, the spout assembly can alternatively be adhesively secured to the sheet material. The threaded spout is configured to receive a sealing cap thereon as well as other fittings used in the dispensing of the bag's contents.

In embodiments, the bottom end of the bag is typically gusseted permitting the bag to expand more when filled to hold a greater quantity of liquid. The sheet material comprising the front and back walls of the bag can extend downwardly beyond the gusset. The extended portions of the front and back sheets can be die cut (or otherwise created) to form a double handle that can be used in holding the bag during transport and can be used as a means to hang the bag, such as during a dispensing operation.

At a center portion of embodiments of the bag, the front and back sheets are thermally welded together (or otherwise joined). As can be appreciated, the size of the joined center portion can vary depending on several factors including, but not limited to the strength of the thermoplastic material when laminated together, and the relative dimensions and desired volume of the bag. Further, the specific shape of the joined center portion can vary. For instance, the center portion can be ovular, rectangular or square, although rounded shapes are typically preferred to those having corners to minimize stress risers. As can be appreciated, variations of the joined center portion can include a center hole cutout.

Advantageously, the joined center portion prevents the bag from expanding in the center when filled with liquid creating a bag that is more amenable to being stacked one on top of another in a cooler with less risk of the stack toppling. Additionally, in variations having a center hole, the filled bags can be received over a vertically orientated rod, which helps hold the bags in place more neatly stacked one on top of the other with a significantly reduced risk of toppling.

Further, the joined center portion creates a bag with a more consistent separation of front and back sheets when the bag is filled with liquid in contrast to a much thicker center section in traditional prior art bags. Testing of prototype embodiments reveal that the new bag configuration improves heating and cooling of the liquid contained therein by 25-45% over prior art bags of similar volume. Furthermore, the temperature gradients experienced during the thawing and warming of the liquid is reduced improving temperature consistency throughout the bag The joined center portion also allows for precise volume measurements within the bag. The overall dimensions of the bag must grow in length and width now that the height of the bag is limited due to the seal. This feature increases surface area along the outside of the bag allowing for further improved performance. If not for the joined center portion, the user of the bag would be forced to carefully measure contents and furthermore, would by necessity have to keep bags lying flat at all times. The joined center portion, when properly sized, dictates the final volume of a completely filled bag. This is important when the bag is used to store colostrum as colostrum is dose dependent based on the size of the calf. The joined center portion is a feature that also allows the bags to retain proper shape even when not lying perfectly flat.

In some embodiments of the storage bag, a self-healing injection port is provided at the spout. This feature permits a user to remove a sample of the contents of the bag or add contents to the bag using a sterile syringe without unduly risking contamination of the bag's contents.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The term "cooler" is used herein to refer to either a refrigerator or a freezer.

Embodiments of the bag are characterized by a "joined center portion". The size and shape of the portions of the front and back sheets of the bag that are joined together can vary significantly and still be within the scope of the appended claims. For instance, the joined center portion can comprise a relatively small dot to a larger circle to a rectangular or diamond shaped portion. In yet other variations, the joined center portion can comprise a line, crossed lines or even serpentine lines.

An Embodiment of a Storage Bag Having a Joined Center Portion

Figure 3:
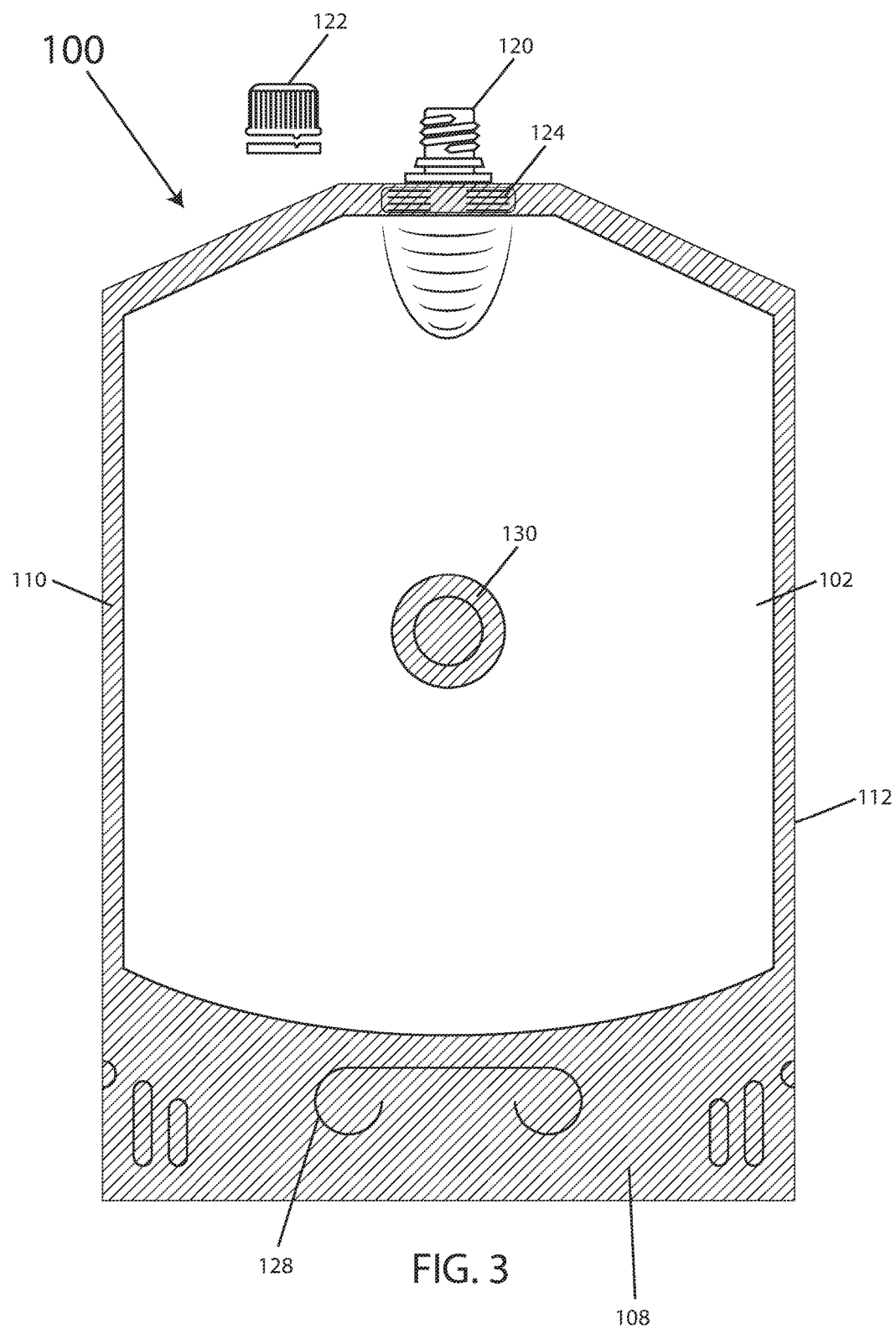
FIG. 3 is a front view of the storage bag indicating the sections thereof that are fused according to one embodiment of the present invention.
Figure 4:
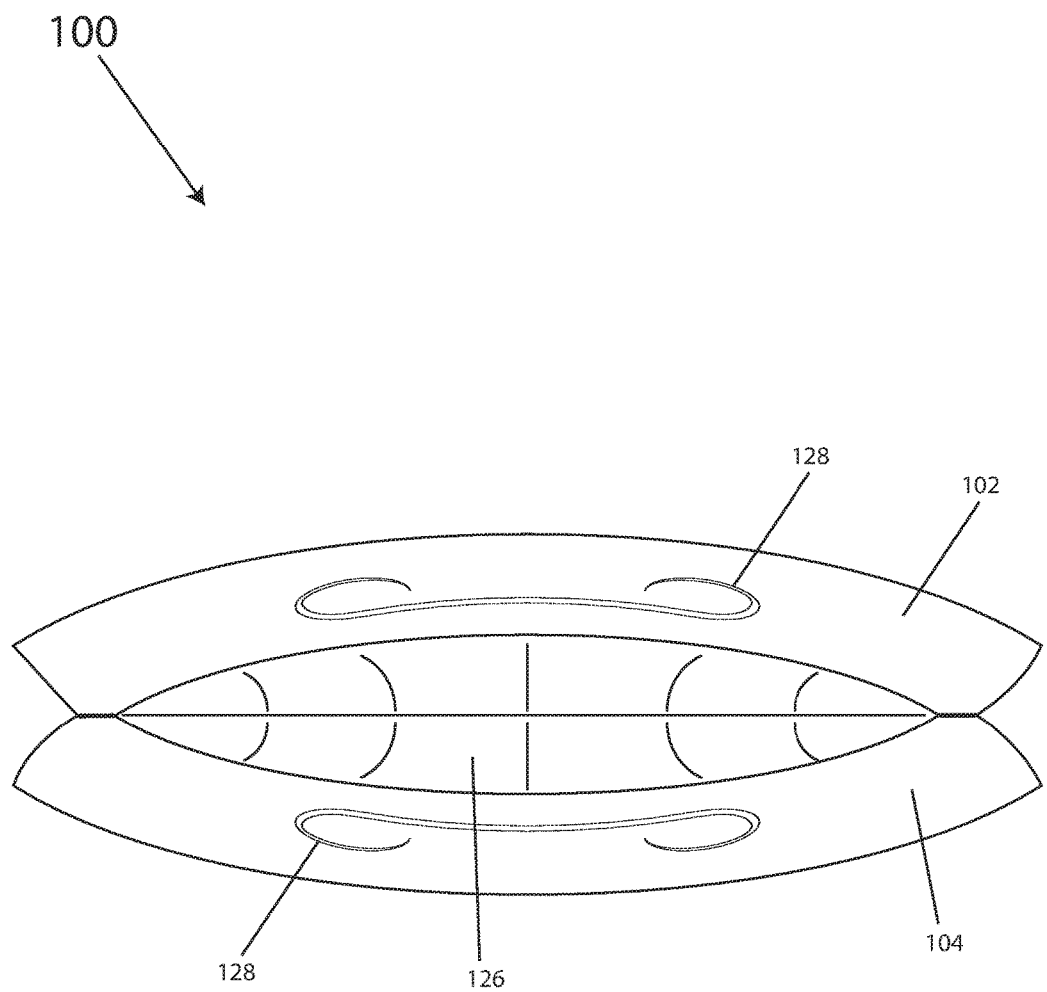
FIG. 4 is a bottom view of the storage bag illustrating the gusseted bottom according to one embodiment of the present invention.

Referring to FIGS. 1, 3 & 4, an embodiment of a storage bag 10 is illustrated. The bag comprises at least a flexible front sheet 102 (or wall) and a flexible back sheet 104 (or wall). As illustrated the sheets are substantially rectangular in shape as is the resulting storage bag. Each of the front and back walls has top, bottom, left and right edges 106-112.

The flexible sheets can be made of any suitable material but most typically comprise a thermoplastic polymer that permits the sheets to be thermally fused or bonded together with the application of sufficient heat. The process of joining the sheets can also be referred to as thermoplastic welding.

Figure 7A:
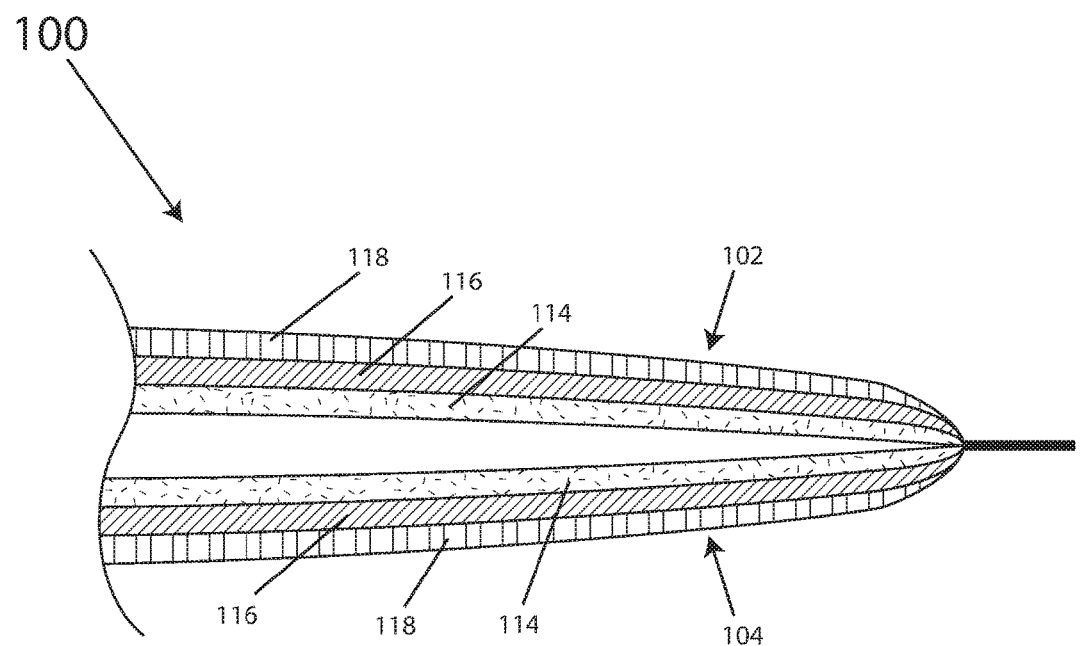
FIGS. 7a & 7b are cross sectional views of laminates that can comprise the sheet material used to construct the storage bag according to embodiments of the present invention.
Figure 7B:
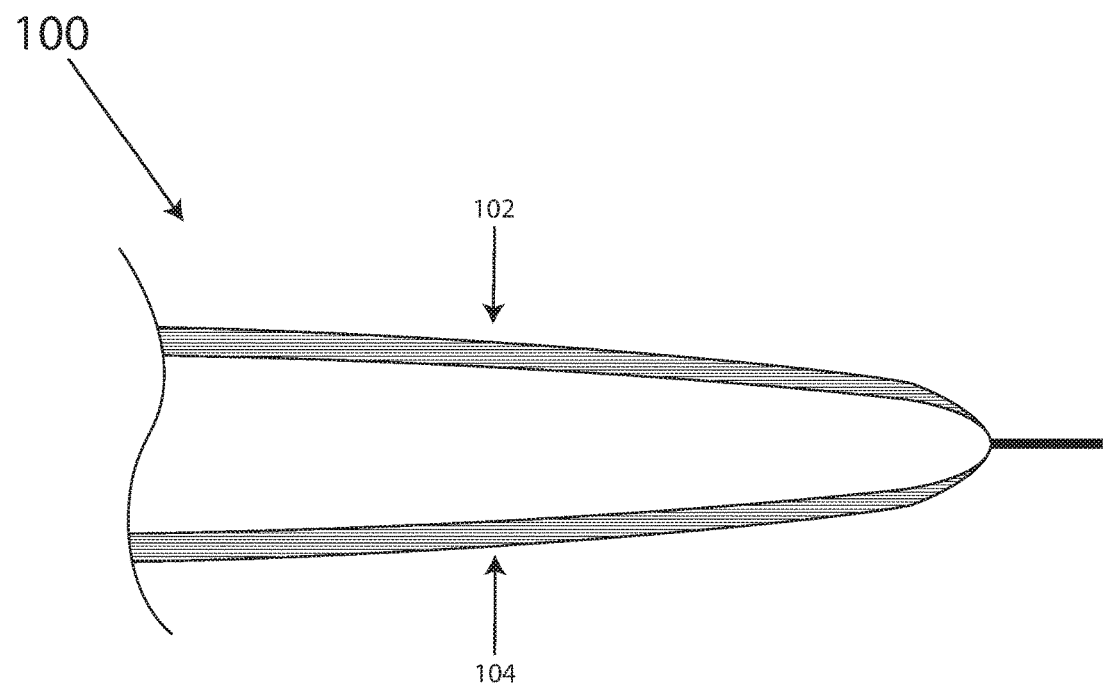

FIGS. 7a and 7b illustrate two partial cross sections of a storage bag 100 wherein front and back sheets are fused together along an edge. In FIG. 7a, the sheets each comprise a three layer laminate. The inside layer 114 comprises a thermoplastic polymeric material which is suitable for thermoplastic welding. The middle layer 116 comprises a metallic material such as aluminum foil. The metallic layer is provided to facilitate more uniform heat distribution over the entire surface of the bag to facilitate more uniform heating of the storage bag's content, such as during a pasteurization process. The outer layer 118 also typically comprises a thermoplastic polymer that may or may not comprise the same polymeric material as the inside layer. Furthermore, outer layer, which is provided in part to protect the thin foil middle layer, can also comprise a thermoset polymer since it does no play a role in the fusing of the front and back walls together.

In FIG. 7b, the sheet material of the front and back walls 102 & 104 comprises a single layer of thermoplastic material. In some variations, the polymer can include additives and filler that improve its thermal conductivity, such as aluminum powder and carbon black.

In variations of the storage bag, the flexible sheet material can comprise materials other than a thermoplastic polymer, such as a coated fabric and a thermoset polymer. Instead of being thermally fused, the sheets or walls of bags using the sheet material variations can be joined by other means including adhesive bonding.

A dispensing orifice or spout 120 is provided at top of the bag sandwiched between the front and back sheets 102 & 104. The orifice can be located in other locations in variations including through the wall of the front or back sheet. As shown, the spout includes a threaded cap 122. The illustrated spout includes a base portion 124 that is typically comprised of a thermoplastic material similar to the material used in the front and back walls permitting the spout to be thermally fused to the sheets proximate an edge thereof. Spouts of other materials are contemplated as well and can be secured to the bag using any suitable means.

Figure 8:
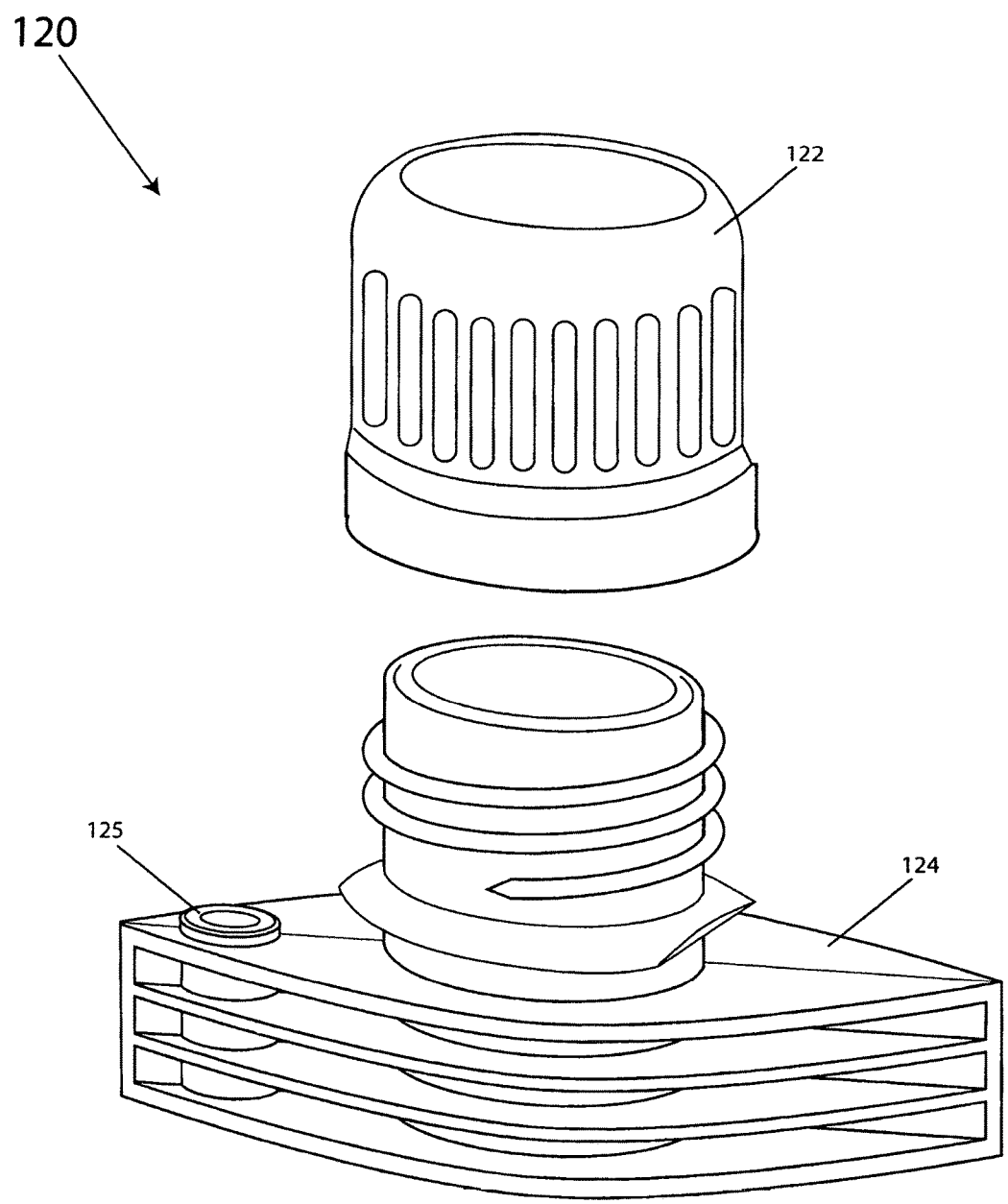
FIG. 8 is an illustration of self healing injection port formed into the spout according to embodiments of the present invention.
Figure 9:
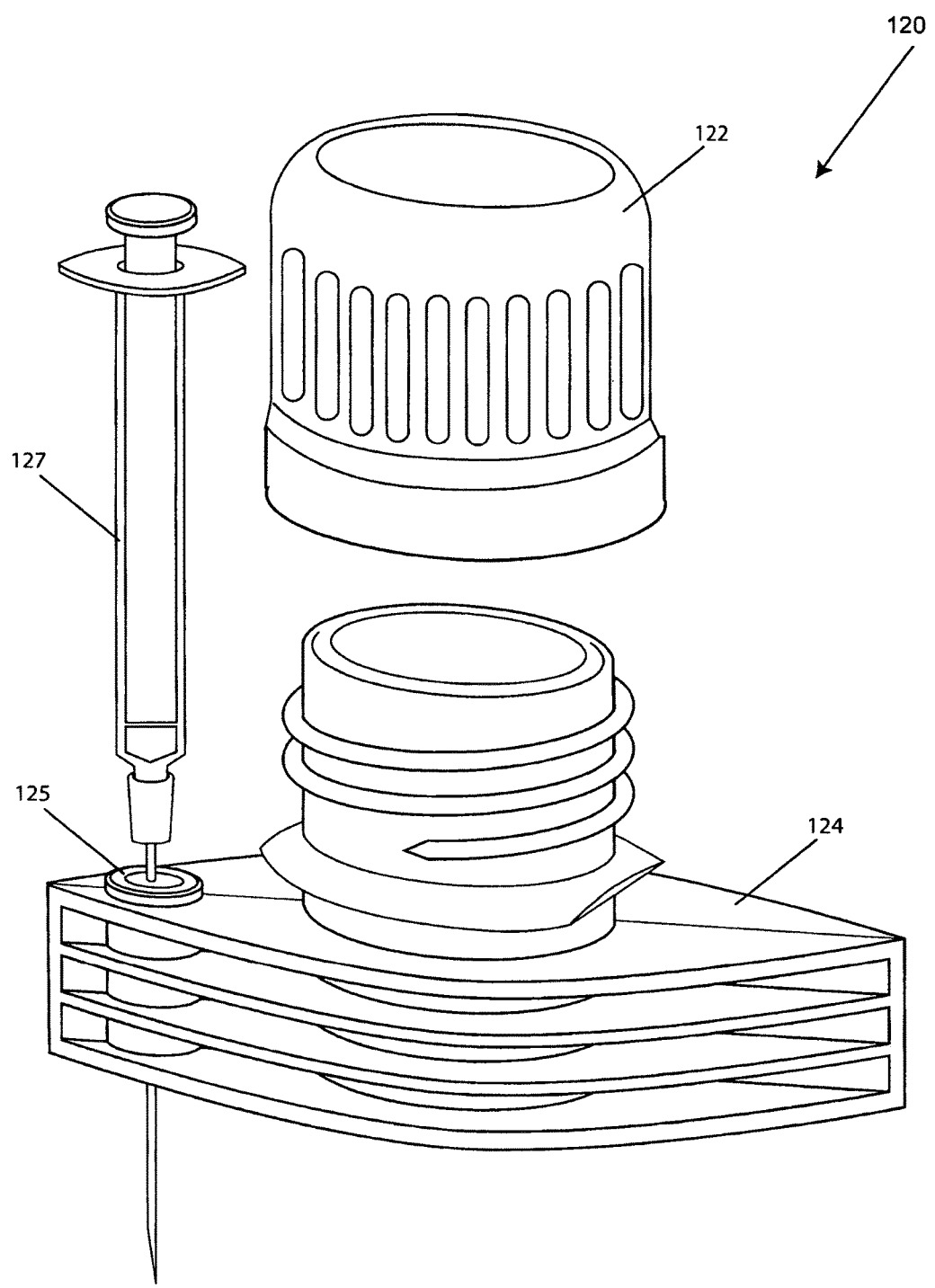
FIG. 9 is an illustration of self healing injection port formed into the spout showing a syringe needle received through the spout according to embodiments of the present invention.

With reference to FIGS. 8 and 9 the base portion 124 can include a self healing injection port 125 that permits access to the contents of the bag with a syringe 127 to either remove a sample or add medicine or other material to the bag without opening the spout by removing the cap and risking spillage or contamination. The injection port typically comprises a bore in the base portion that extends therethrough and a self-healing elastomeric stopper secured in the bore to provide an air tight seal. In use a sterile syringe needle is inserted into the bag through the stopper and a sample is removed or material is added to the bag. Thereafter, the syringe needle is removed and the elastomer closes at the slit to seal the contents from the atmosphere.

The edges of the front and back sheet are joined together to form the storage bag. Typically the edges are thermoplastically welded although, as mentioned above, the sheets can be adhesively joined together in variations especially those variations wherein the sheet materials are not comprised of a thermoplastic. In the illustrated embodiment, the front and back walls are thermally fused to each other along the top and left and right edges 106, 110 & 112.

As shown in FIG. 4, the sheets are fused generally proximate the bottom edge 108 to a gusset sheet 126. The front and back sheets extend downwardly from their respective intersections with the gusset sheet. Handle slits 128 are provided through the sheets in this area to permit a user to more easily carry the storage bag especially when full. The handle slits can also be used as a location from which to hang the storage bag.

In the illustrated embodiment, a single gusset sheet 126 is provided; however, additional gusset sheets can be provided in variations along other edges to further increase the capacity of the storage bag. For instance, a variation is contemplated wherein the left and right edges include gusset sheets and the top and bottom edges of the front and back walls are directly thermally fused together. Numerous other variations are also contemplated as are variations that do not have any gusset sheets.

Most notably as seen in the figures, a joined center portion 130 proximate a center of the front wall 102 is thermally bonded to a center of the back wall forming a joined center portion. The size and shape of the fused section can vary as desired and with the size of the storage bag and its design capacity. For instance the joined center portion can be circular as illustrated but can also be other shapes including, for instance an "X", or even a serpentine line.

Figure 2:
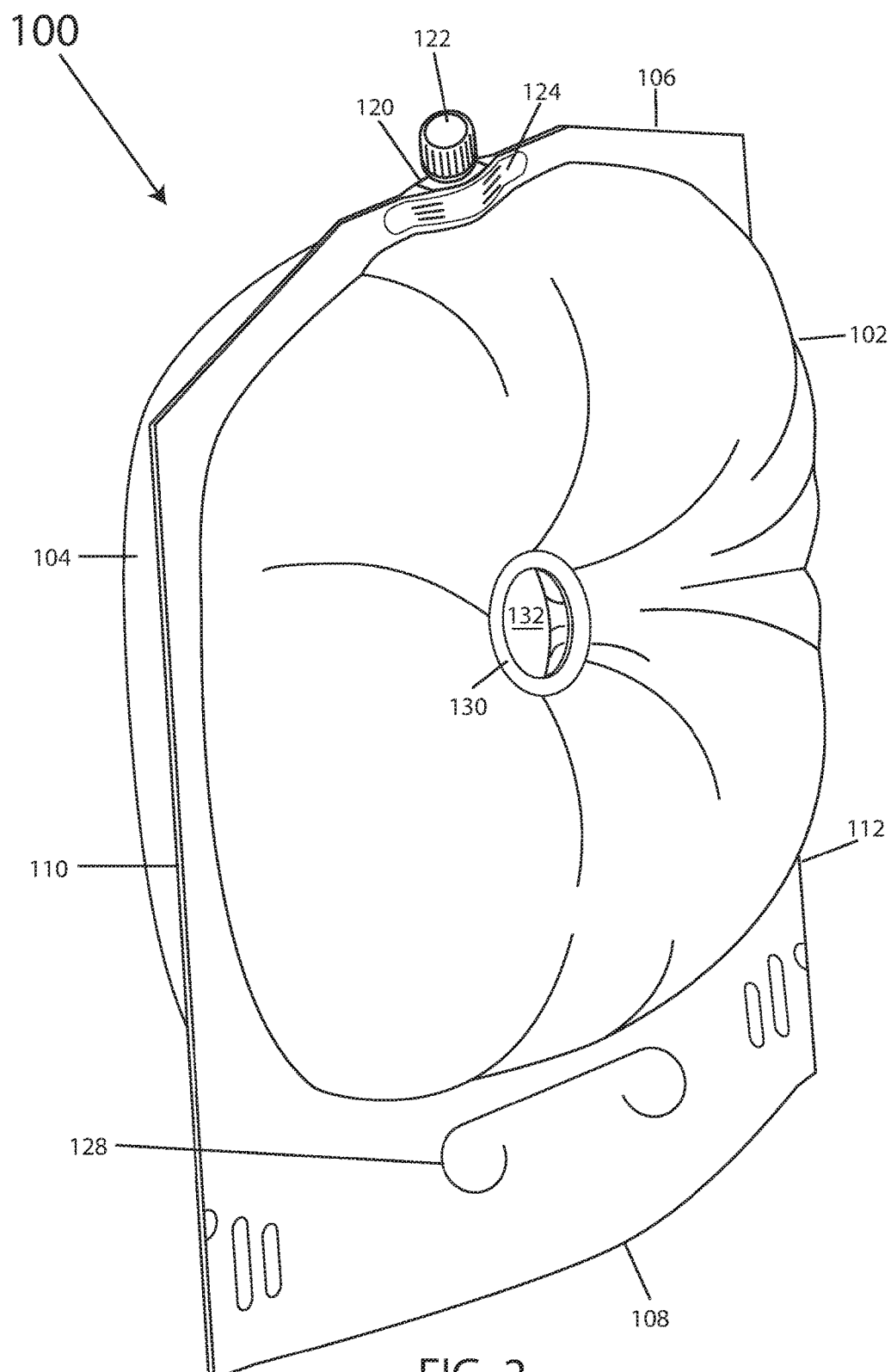
FIG. 2 is a perspective view of a storage bag having fused center section and a hole extending therethrough according to one embodiment of the present invention.

FIG. 2 illustrates a variation wherein a hole 132 has been made through the joined center portion through which a rod can be inserted. In variations, the joined center portion 130 can be joined by one or both of mechanical or adhesive means in lieu of thermal fusing.

Figure 5:
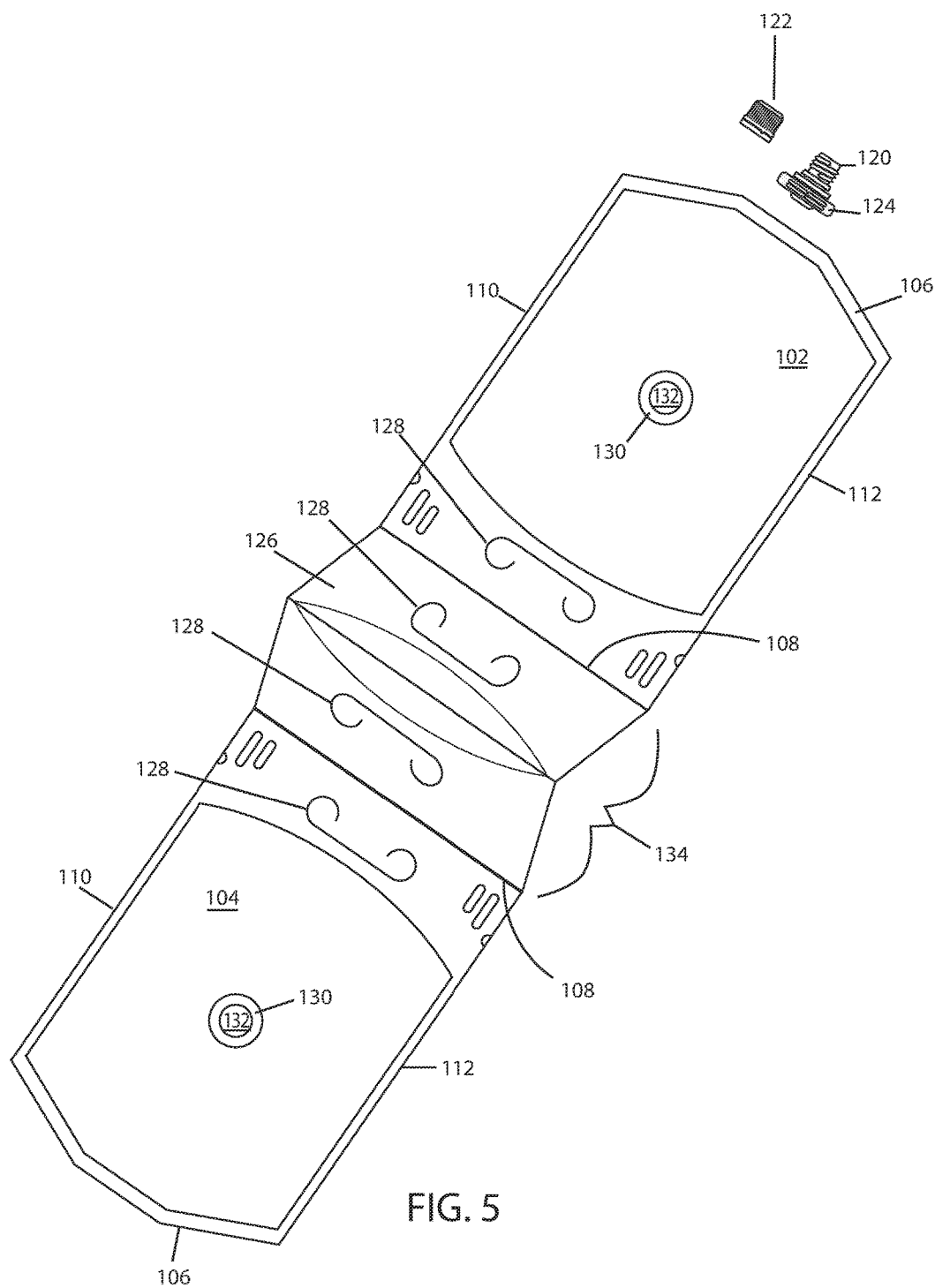
FIG. 5 is an exploded perspective view of the components comprising the storage bag according to one embodiment of the present invention.

FIG. 5 is an unassembled view of a storage bag. Of particular note, is that the front, back and gusset sheets all comprise a single preform sheet 134 of material. The bottom edge 108 of the front sheet 102 and the gusset sheet are delineated by a first fold line. The bottom edge 108 of the back sheet 104 and the gusset sheet are delineated by a second fold line. Further, two halves of the gusset sheet are delineated by a third fold line 136. Holes 132 are stamped out of the sheet at the joined center portion 130. In this illustration the weld or thermal fusion areas are also delineated by lines although these lines may not be visible on an actual preform sheet and are provided herein for demonstrative purposes. Handle slits 128 are also provided. In at least one variation the preform is fabricated from a roll of sheet material by way of die cutting. A die cut tool can cut the entire preform in a single step and can also be configured to simultaneously form fold line creases.

As shown in FIG. 5, the unassembled bags also includes a threaded spout 120 and associated threaded cap 122. The spout, which is comprised primarily of a thermoplastic material includes a base portion 124 that in fabrication is sandwiched between the top edges of the front and back walls and fused in place as the front and back walls are fused together.

To fabricate the storage bag from the preform, the bag is folded over such that all the handle slits are aligned and the base portion of the spout is positioned between the top edges of the front and back walls. One or more heating tools are lowered against the folded preform to heat the fusion areas and create the bag. In some variations, the joined center portion hole is not previously formed and can be die cut or punch formed out of the joined center portion.

A Method of Processing Colostrum Using an Embodiment of the Storage Bag

Embodiments of the storage bag described herein are typically used to store fluids, such as bovine colostrum, for the care and feeding of livestock and in particular bovine calves.

Initially, the colostrum is collected and received in a storage bag through the spout or orifice. Once filled, the spout is closed such as by threading the cap thereon.

Next, the colostrum is pasteurized. In some variations, the colostrum is pasteurized in a Perfect Udder® colostrum bag pasteurizer by Dairy Tech, Inc. of Severance, Colo.

Figure 6A:
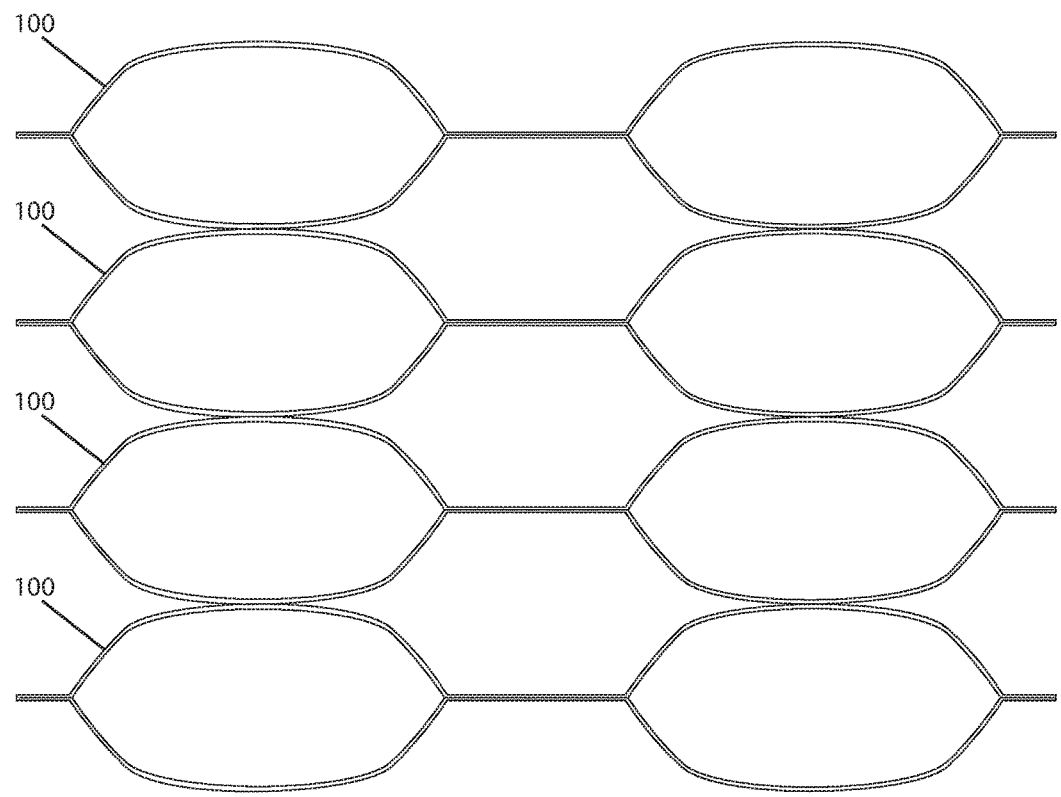
FIGS. 6a & 6b are cross sectional side views of a plurality of bags stacked one on top of the other according to embodiments of the present invention.
Figure 6B:
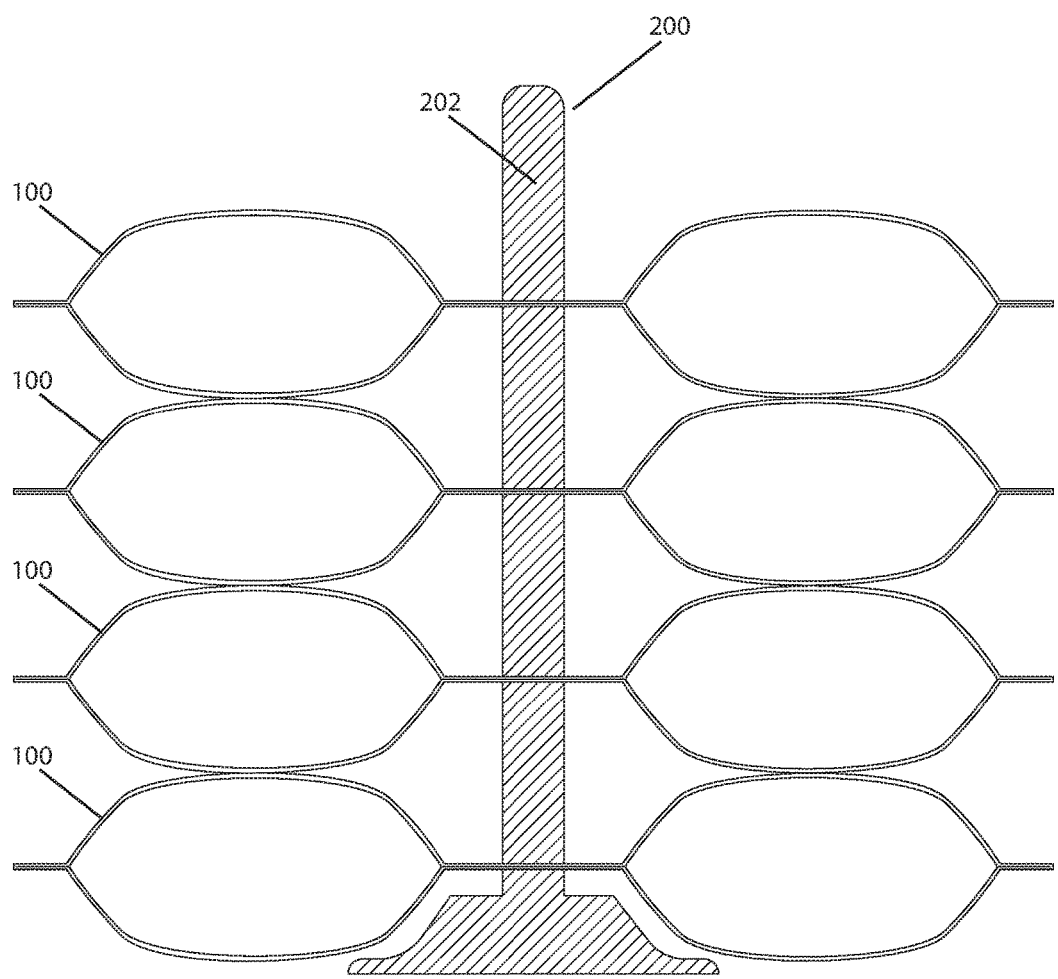

After pasteurization, the filled storage bags are stored in a refrigerator or freezer until needed for use. Typically, the storage bags are stacked one on top of another to efficiently make use of the space in the cooler. The design of the storage bags with the joined center portion facilitates easier and more stable stacking compared to prior art bags permitting more bags to be stacked one on top of the other as shown in FIG. 6a. If the embodiment of the storage bag further comprises a hole extending through the joined center portion, a stand having a vertically orientated pole can be provided in the cooler over which the stacked bags are received to further increase stability of the storage bag stack as shown in FIG. 6b.

When ready to feed a calf, the storage bag can be removed from the cooler and warmed to feeding temperature. The colostrum can be warmed in a Perfect Udder® colostrum bag pasteurizer. The joined center portion inhibits expansion of the bag, thereby limiting the total thickness of frozen or cooled contents. This physical limitation in thickness facilitates faster reheating of the contents so that they can be presented to the calf more quickly.

Once warmed, the spout cap can be removed, a nipple or feeding tube attached to the storage bag and the warmed contents can be fed to the calf.

Other Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

The storage bag is primarily described herein with reference to use in storing bovine colostrum; however, it is to be appreciated that variations of the storage bag can be used for numerous other purposes and to store numerous other substances. For instance, variations of the bag can be used to store and pasteurize drinking water or other beverage liquids for consumption. The bag can be used to in conjunction with add water type meals, such as soup, wherein water is added to the bag already containing the dry portions of the meal. The foregoing examples are not considered to be exhaustive but illustrative that embodiments of the storage bag described herein can be used for numerous purposes.

I claim:

1. A flexible storage bag comprising:
a front wall having a front top edge, a front bottom edge, a front left edge and a front right edge, the front wall comprising a flexible sheet material;
a back wall having a back top edge, a back bottom edge, a back left edge and a back right edge, the back wall comprising the flexible sheet material; and
a dispensing orifice;
wherein (i) the back wall is one or both of adhesively or thermally bonded to the front wall along at least two respective edges of the front and back walls, and (ii) the dispensing orifice is attached to one or both of the front and back walls permitting ingress and egress of a liquid into and out of the storage bag;
wherein portions of the front wall that are one or both of adhesively or thermally bonded to the back wall that do not include edges of the walls consist of a joined center portion proximate a center of the front wall and the back wall.

2. The flexible storage bag of claim 1, wherein the flexible sheet material comprises a thermoplastic polymer.

3. The flexible storage bag of claim 1, wherein the flexible sheet material comprises a laminate having at least a first thermoplastic polymer layer and a metal foil layer.

4. The flexible storage bag of claim 3, further comprising a second thermoplastic polymer layer, the first and second thermoplastic polymer layers sandwiching the metal foil layer.

5. The flexible storage bag of claim 1, further comprising a gusset wall, the gusset wall being comprised of the sheet material, the gusset wall being adhesively or thermally bonded to the front and back wall proximate respective front and back bottom edges.

6. The flexible storage bag of claim 5, wherein the first sheet is integrally joined to the gusset sheet at the front bottom edge, and the second sheet is integrally joined to the gusset sheet at the second bottom edge.

7. The flexible storage bag of claim 1, wherein the dispensing orifice comprises a spout, the spout being thermally or adhesively bonded between a front and back edge of the front and back left, right, top and bottom edges.

8. The flexible storage bag of claim 1, further comprising a hole extending through the joined center portion.

9. A flexible storage bag comprising:
a flexible first sheet having a first sheet periphery, a first sheet exterior surface and a first sheet interior surface;
a flexible second sheet having a second sheet periphery, a second sheet exterior surface and a second sheet interior surface;
a closable spout;
wherein (i) at least a portion of the first sheet periphery is one or both of thermally and adhesively bonded to the second sheet periphery with the first and second sheet interior surfaces facing each other, (ii) the first sheet interior surface being one or both of thermally and adhesively bonded to the second sheet interior surface at a joined center portion proximate a center location of the respective first and second sheet interior surfaces, and (iii) the spout is attached to one or both of the front and back sheets permitting ingress and egress of a liquid into and out of the storage bag;
wherein when the flexible storage bag is filled with colostrum, the flexible first sheet and the flexible second sheet are consistently separated about the joined center portion.

10. The flexible storage bag of claim 9, wherein the flexible first and second sheets each comprise a laminate having at least a first thermoplastic polymer layer and a metal foil layer.

11. The flexible storage bag of claim 10, wherein each of the flexible first and second sheets further comprise a second thermoplastic polymer layer, the first and second thermoplastic polymer layers sandwiching the metal foil layer.

12. The flexible storage bag of claim 9, further comprising a hole extending through the joined center portion.

13. In combination the storage bag of claim 12, a second storage bag having a hole extending through a joined center portion, a third storage bag having a hole extending through the joined center portion, and a stand including a base and a vertical rod extending upwardly from the base, wherein the storage bag, the second storage bag and the third storage bag are stacked with the vertical rod passing through the respective holes.

14. The flexible storage bag of claim 9, further comprising a flexible gusset sheet having a gusset sheet periphery, the gusset sheet periphery being thermally or adhesively bonded to both portions of the first and second sheets generally proximate portions of the first and second sheet peripheries.

15. The flexible storage bag of claim 14, wherein the first sheet is integrally joined to the gusset sheet at a first fold dividing the first sheet and the gusset sheet, and the second sheet is integrally joined to the gusset sheet at a second fold dividing the first sheet and the gusset sheet.

16. The flexible storage bag of claim 9, wherein the spout is thermally or adhesively bonded between the first and second sheet proximate the peripheries of each.

17. The flexible storage bag of claim 9, wherein the spout includes a self healing injection port.

18. A method of using a flexible storage bag of claim 9, the method comprising:
filling the storage bag with colostrum through the spout and closing the spout once the storage bag is filled;

pasteurizing the colostrum in the storage bag by placing the storage bag in a pasteurizer;
stacking the storage bag filled with colostrum after pasteurization in a cooler on top of another storage bag of claim 9 to cool the colostrum; and
removing the storage bag from the cooler;
warming the storage bag and colostrum; and
feeding the colostrum to a calf from the storage bag.

19. The method of claim 18, wherein the storage bag further comprises a hole extending through the joined center portion and the method further comprises providing a stand including a vertically orientated rod and sliding the storage bag over the rod when stacking.

20. The method of claim 18, wherein said feeding the colostrum to the calf further comprises opening the spout, attaching a feeding nipple to the spout and placing the nipple into the mouth of a calf.

21. A combination comprising:
a first flexible storage bag comprising:
 a flexible first sheet having a first sheet periphery, a first sheet exterior surface and a first sheet interior surface;
 a flexible second sheet having a second sheet periphery, a second sheet exterior surface and a second sheet interior surface;
 a closable spout;
 wherein (i) at least a portion of the first sheet periphery is one or both of thermally and adhesively bonded to the second sheet periphery with the first and second sheet interior surfaces facing each other, (ii) the first sheet interior surface being one or both of thermally and adhesively bonded to the second sheet interior surface at a joined center portion proximate a center location of the respective first and second sheet interior surfaces, (iii) the joined center portion including a hole extending through the joined center portion;
a second storage bag having a hole extending through a joined center portion;
a third storage bag having a hole extending through the joined center portion; and
a stand including a base and a vertical rod extending upwardly from the base;
wherein the first storage bag, the second storage bag, and the third storage bag are stacked with the vertical rod passing through the respective holes.

22. A combination comprising:
a first flexible storage bag comprising:
 a front wall having a front top edge, a front bottom edge, a front left edge and a front right edge, the front wall comprising a flexible sheet material;
 a back wall having a back top edge a back bottom edge, a back left edge and a back right edge, the back wall comprising the flexible sheet material; and
 a dispensing orifice;
 wherein (i) the back wall is one or both of adhesively or thermally bonded to the front wall along at least two respective edges of the front and back walls, (ii) a joined center portion proximate a center of the front wall is one or both of thermally or adhesively bonded to a proximate center of the back wall, and (iii) the joined center portion including a hole extending through the joined center portion;
a second storage bag having a hole extending through a joined center portion;
a third storage bag having a hole extending through the joined center portion; and
a stand including a base and a vertical rod extending upwardly from the base;
wherein the first storage bag, the second storage bag, and the third storage bag are stacked with the vertical rod passing through the respective holes.

23. A flexible storage bag consisting essentially of:
a front wall having a front top edge, a front bottom edge, a front left edge and a front right edge, the front wall comprising a flexible sheet material;
a back wall having a back top edge, a back bottom edge, a back left edge and a back right edge, the back wall comprising the flexible sheet material; and
a dispensing orifice;
a gusset wall being comprised of the flexible sheet material, the gusset wall being adhesively or thermally bonded to the front and back wall proximate respective front and back bottom edges;
wherein portions of the front wall that are one or both of adhesively or thermally bonded to the back wall include (i) the front top edge and back top edge, (ii) the front left edge and the back left edge, (iii) the front right edge and the back right edge, (iv) and a joined center portion proximate a center of the front wall and the back wall.

* * * * *